United States Patent Office 3,296,225
Patented Jan. 3, 1967

3,296,225
FUNCTIONAL POLYMERS CONTAINING PENDANT ACYLOXY GROUPS AND PROCESS FOR PREPARING SAME
Roy Worrall, Newport, England, assignor to Monsanto Chemicals Limited, London, England, a British company
No Drawing. Filed Dec. 21, 1962, Ser. No. 246,355
Claims priority, application Great Britain, Dec. 21, 1961, 45,832/61
8 Claims. (Cl. 260—80.5)

This invention relates to novel functional polymers and to processes for their production.

In the field of polymer technology considerable effort is devoted to investigating ways in which the structure of established polymers such as for instance polystyrene, polyethylene and polymethyl methacrylate can be modified, with a view to producing materials having improved properties or new applications.

It is an object of this invention to provide a new family of polymers having reactive sites together with processes for their preparation.

Another object is the provision of a new family of ethylenically unsaturated polyesters together with processes for their manufacture.

Other objects will in part be obvious and will in part appear hereinafter.

These and other objects are attained through the provision of functional polymers having the structure of a copolymer of an olefinic hydrocarbon with at least one comonomer, the copolymer containing substituent ethylenically unsaturated acyloxy groups derived from acrylic acid or an acrylic acid carrying a substituent in the alpha-position, i.e., having the structure

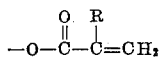

wherein R is either hydrogen or an alkyl group of 1 to 4 carbon atoms.

Such a polymer is, for example, one having the structure of a copolymer of an olefinic hydrocarbon with an ester derived from an ethylenically unsaturated alcohol and an ethylenically unsaturated acid that is acrylic acid or an alpha-substituted acrylic acid, the portion of the ester that is copolymerized being the ethylenically unsaturated alcohol portion of the molecule, so that the acrylic acid portions are present in unpolymerized form as

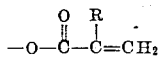

groups as defined above.

Taking ethylene as representative of the olefinic hydrocarbon, a new functional polymer of the invention can, for instance, be of the structure of a copolymer of ethylene with vinyl acrylate in which it is the vinyl group that has taken part in the copolymerization and the acrylate portion is present in unpolymerized form in the copolymer. Another example, for instance, is of the structure of a copolymer of ethylene and vinyl acetate in which some or all of the acetoxy groups have been replaced by an acyl radical derived from acrylic or methacrylic acid.

The process of the invention is one for the production of a functional polymer of the invention, in which ethylenically unsaturated acyloxy groups

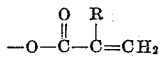

as defined above are introduced into a starting-material having the structure of a copolymer of an olefinic hydrocarbon with an ethylenically unsaturated alcohol or the structure of a copolymer of an olefinic hydrocarbon with an ethylenically unsaturated alcohol that is at least partially esterified by a saturated acid, by respectively the esterification of hydroxyl groups to form ethylenically unsaturated acyloxy groups

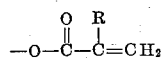

or the replacement of saturated acyloxy groups by said ethylenically unsaturated acyloxy groups.

The olefinic hydrocarbon component of the copolymer can be for instance of the structure of an alpha-olefin, such as ethylene, propylene, 1-butene, isobutene, or a higher homolog having either a straight or branched chain, for example 1-hexene or 2,2,4-trimethylpentene-1. The olefinic hydrocarbon component in other instances can be or can contain a cyclic olefin, such as cyclopentene or cyclohexene; or a compound having more than one olefinic bond, for example butadiene, isoprene, or 1,5-hexadiene; or an aryl olefin, such as styrene. Ethylene is often the preferred material.

The ethylenically unsaturated acyloxy group

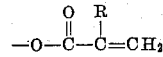

is, as has been stated, derived from acrylic acid or from an alpha-substituted acrylic acid such as, for example, methacrylic acid, ethacrylic acid, butacrylic acid, etc.

Where the new functional polymer is defined as one having the structure of a copolymer of an olefinic hydrocarbon with an ester in the way described above, the ethylenically unsaturated acid component of the ester is of course as described in the previous paragraph. The ethylenically unsaturated alcohol (normally aliphatic) from which the ester is derived can be fore example vinyl alcohol (notionally), a substituted vinyl alcohol, allyl alcohol, methallyl alcohol or crotyl alcohol; it can also be a cyclic alcohol, for instance, 2-cyclohexene-1-ol.

The new functional polymers of this invention may also contain acyloxy groups of the structure:

(1)

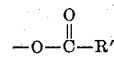

or (2)

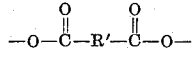

wherein R' is a hydrocarbon residue free of ethylenic and acetylenic unsaturation, generally containing from 1 to about 12 carbon atoms. Such acyloxy groups are derived from a saturated acid such as, for example, monobasic aliphatic acids of which acetic, butyric, caprylic and stearic acid are exemplary; monobasic aromatic acids of which benzoic acid is exemplary; dibasic aliphatic acids of which adipic and sebacic acids are exemplary; and dibasic aromatic acids of which phthalic and terephthalic acids are exemplary.

Moreover the functional polymer can contain hydroxyl groups attached to the copolymer backbone. For example the resin can have the structure of a copolymer as defined that is also derived from an ethylenically unsaturated aliphatic alcohol as a component monomer, for instance vinyl alcohol or one of the other unsaturated alcohols referred to above. Thus, for example, the final resin can have the structure of an ethylene-vinyl acrylate-vinyl alcohol copolymer.

The preferred functional polymers are those where the olefinic hydrocarbon is a lower alpha-olefin, for example, ethylene or propylene, and where a comonomer is an ester of vinyl alcohol with acrylic acid or an alpha-substituted homolog, such as methacrylic acid. Where the resin contains acyloxy groups (1)
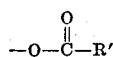

or (2)
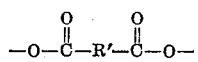

as defined above, derived from a saturated acid, this is preferably a lower aliphatic acid, such as acetic acid, etc.

Specific instances of the novel functional polymers of this invention are those having the structures of: a copolymer of ethylene and vinyl acrylate; a copolymer of ethylene, vinyl alcohol and vinyl acrylate; a copolymer of ethylene, vinyl acetate and vinyl acrylate; a copolymer of ethylene, propylene and vinyl methacrylate; a copolymer of propylene, vinyl alcohol, vinyl butyrate and vinyl methacrylate; and a copolymer of ethylene, allyl alcohol, vinyl alcohol and vinyl ethacrylate. It will be understood that as has been explained, it is the vinyl or allyl group in each instance that has taken part in the copolymerization.

By way of example only, the new functional polymers of this invention can have a molecular structure of which part can be represented by the formula:

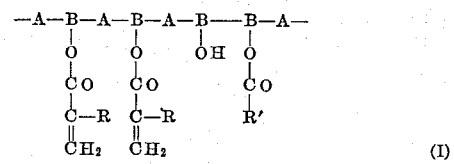

where A is derived from the olefinic hydrocarbon and B from the hydrocarbon group of an ethylenically unsaturated alcohol. In general, the distribution of the A and B units in the copolymer chain is quite random, and there can be wide variations in the relative members of each. There can also be wide variations in the relative numbers of the different groups. However, while the functional polymers of this invention must necessarily contain substituent

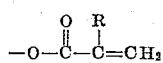

groups, the presence of the other functional groups discussed above is optional.

In general, in the functional polymers of this invention, the proportion that is derived from the olefinic hydrocarbon and the number of acyloxy groups

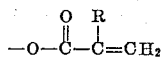

and of the other optional groups can vary over a wide range. By way of example, the polymer can be derived for instance from about 25 molar percent to about 99 molar percent of the olefinic hydrocarbon, although in certain instances there can be a smaller proportion than this lower limit. The preferred polymers are those derived from not more than 97 molar percent of the olefinic hydrocarbon, particularly those where the molar percentage is within the range 50 to 95, for example, 60, 70, 80 or 90.

The molar percentage of ethylenically unsaturated ester units

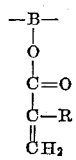

(as shown in Formula I) in the copolymer is in general not less than about 0.1, and is normally within a range of about from 1 to 20. Very useful functional polymers are those where the molar percentage of ethylenically unsaturated ester units is within a range of about from 1 to 10, for example 2.5, 5.0 or 7.5.

Where the aggregate molar percentages of olefinic hydrocarbon and ethylenically unsaturated ester units is less than 100, the balance of the copolymer structure is, of course, provided by unsaturated alcohol units

or saturated ester units

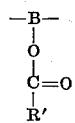

The copolymer starting-material employed in the process of the invention can be one having the structure of a copolymer of an olefinic hydrocarbon with an ethylenically unsaturated alcohol, appropriate to the new functional polymer that it is desired to make. For example, in a typical instance a starting-material can have a molecular structure of which part is represented by the formula:

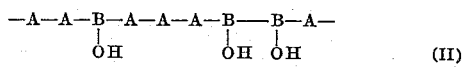

where A and B each have the same significance as in Formula I. Alternatively, the starting-material can be a similar copolymer but having some or all of the hydroxyl groups esterified by a saturated acid; in typical instances, fragments of the molecular structures can then be represented by formulae such as:

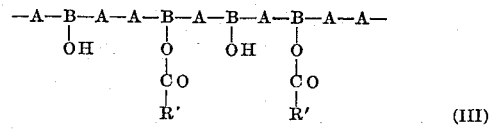

and

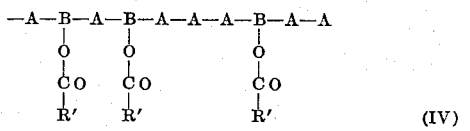

The copolymer starting-material can often be obtained by the direct interpolymerization of the olefinic hydrocarbon with an appropriate ethylenically unsaturated alcohol or ester monomer. Alternatively, a starting-material of a particular type can be obtained for instance by hydrolysis or, as the case may be, by esterification of a different type of material; the former procedure is necessary where a copolymer of ethylene and vinyl alcohol (notional) is required, because vinyl alcohol does not of course exist as a separate entity. Thus, for example, a starting-material having the structure of an ethylene-vinyl alcohol copolymer can be obtained by the hydrolysis of a copolymer of ethylene and say vinyl acetate.

In the process of the invention, the esterifying agent responsible for the introduction of unsaturated acyloxy groups

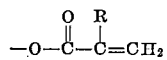

by esterification of hydroxyl groups or by replacement of saturated acyloxy groups is in general acrylic acid or an alpha-substituted acrylic acid as hereinabove set forth or a suitable functional derivative. A derivative can, for example, be an anhydride, acid halide or ester of the unsaturated acid.

Normally, it is an ester of an unsaturated acid which is employed where a saturated acyloxy group is to be replaced in the process, although the acid itself can be employed. The unsaturated acid can be any previously referred to as being one from which a group

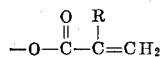

can be derived.

Where the new resin is to contain saturated acyloxy groups (1)

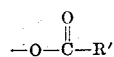

or (2)

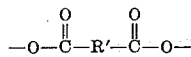

as well as ethylenically unsaturated ones it can be produced by final esterification of any free hydroxyl groups by a saturated acid. For instance, an ethylene/vinyl acetate copolymer can be hydrolyzed, some of the hydroxyl groups can be esterified with acyl groups derived from acrylic or methacrylic acid, and the remaining hydroxyl groups can be esterified with acetyl groups. A similar kind of resin can also be obtained by incomplete replacement of saturated acyloxy groups by ethylenically unsaturated acyloxy groups (for instance by trans-esterification) in a starting-material that originally contained acyloxy groups that were all saturated.

The reaction is generally brought about by contacting the copolymer starting-material with the required amount of the appropriate unsaturated acid or one of its derivatives. Preferably, the reaction is carried out with the reactants in solution; in certain instances the esterifying agent responsible for the introduction of the unsaturated acyl groups will dissolve the copolymer starting-material; where this is not so, the reactants can be dissolved in a solvent, usually an organic solvent, for instance, a hydrocarbon or halohydrocarbon such as toluene or chloroform.

Where the esterifying agent is an acid or an ester, the process is preferably carried out in the presence of a catalyst. This can be, for example, a mineral acid, such as sulphuric or hydrochloric acid, or an organic acid such as benzenesulphonic acid, p-toluenesulphonic acid or a polysulphonated resin. Alternatively the catalyst can be a basic one, for instance, lithium, sodium, or potassium methoxide or ethoxide, or titanium butoxide.

Where the esterifying agent is an anhydride, an acidic catalyst can be employed, but in certain instances a base such as pyridine provides a useful alternative.

The presence of a polymerization inhibitor such as, for example, hydroquinone in the reaction system often assists in reducing side reactions.

To achieve a practical rate of reaction, the process of the invention is generally operated at a somewhat elevated temperature, which can, for example, be one within a range of from about 30° or 40° C. to about 200° C. Good results are obtained by operating at a temperature within the range of 40° to 150° C., such as 50° to 100° C. Useful results are often obtained in the range of 80° to 100° C.

The invention is illustrated by the following examples.

*Example I*

This example describes the production of a functional polymer having the structure of an ethylene-vinyl alcohol-vinyl acrylate copolymer by partial esterification with acrylic acid of a starting-material having the structure of an ethylene-vinyl alcohol copolymer (hereinafter referred to as the ethylene-vinyl alcohol copolymer), which was in turn obtained by the hydrolysis of an ethylene-vinyl acetate copolymer containing 30% by weight of vinyl acetate.

50 cc. of acrylic acid containing 1 gram of toluene p-sulphonic acid and 1 gram of hydroquinone are added to a solution of 25 grams of the ethylene-vinyl alcohol copolymer in 50 cc. of toluene, and the mixture is maintained at 85° C. for 24 hours. The mixture is then poured into an excess of methanol, precipitating 26 grams of product. The product is collected by filtration, washed with methanol and then dried under vacuum at 60° C. Analysis of the polymer, by estimating the quantity of standard propanolic sodium hydroxide solution required to hydrolyze a sample back to the starting-material, shows that it has the structure of a copolymer of ethylene, vinyl alcohol and vinyl acrylate in the proportions by weight of about 70 to 15 to 15, respectively (corresponding to molar percentages of about 83.5, 11.5 and 5.0 respectively).

*Example II*

A functional polymer having the structure of a copolymer of about 70% by weight of ethylene, about 14% by weight of vinyl alcohol and about 16% by weight of vinyl methacrylate is obtained following the procedure described in Example I substituting methacrylic acid for the acrylic acid employed therein.

*Example III*

This example describes the preparation of a functional polymer having the structure of an ethylene-vinyl alcohol-vinyl methacrylate copolymer by the action of methacrylic anhydride on the ethylene-vinyl alcohol copolymer employed in Example I.

5 cc. of methacrylic anhydride are added to a solution of 5 grams of the ethylene-vinyl alcohol copolymer in a mixture of 10 cc. of toluene and 10 cc. of pyridine. The mixture is maintained at about 85° C. for 3 hours, and the product is then isolated following precipitation with methanol in the usual manner. The polymer has the structure of a copolymer of about 70% by weight of ethylene, about 21% by weight of vinyl alcohol and about 9% by weight of vinyl methacrylate (corresponding to molar percentages of about 81.5, 15.6 and 2.9 respectively).

*Example IV*

This example describes the preparation of a functional polymer having the structure of an ethylene-vinyl alcohol-vinyl acrylate copolymer by the reaction of ethyl acrylate with the ethylene-vinyl alcohol copolymer employed in Example I.

1 litre of ethyl acrylate containing 10 grams of toluene p-sulphonic acid is added to a solution of 400 grams of the ethylene-vinyl alcohol copolymer in 2 litres of toluene. The mixture is maintained at about 85° C. for 20 hours, and the product is then isolated in the usual manner. The polymer is found to contain acrylate groups equivalent to about 4% by weight of vinyl acrylate.

*Example V*

This example describes the prepartion of a functional polymer having the structure of an ethylene-vinyl acetate-vinyl methacrylate copolymer by the action of methacrylic acid on an ethylene-vinyl acetate copolymer in the presence of an acid catalyst.

1.5 cc. of 30% by weight ethanolic sulphruic acid are added to a solution of 5 grams of a copolymer of 43% by weight of ethylene and 57% by weight of vinyl acetate in 10 cc. of methacrylic acid. The mixture is maintained at about 50° C. for 4 hours and is then poured into an excess of methanol. The product is isolated in the usual manner, yielding about 4.5 grams of polymer.

*Example VI*

This example describes the preparation of a functional polymer having the structure of an ethylene-vinyl acetate-vinyl acrylate copolymer by the action of methylacrylate on an ethylene-vinyl acetate copolymer in the presence of an acid catalyst.

8 cc. of a 10% by weight solution of hydrogen chloride in methanol is added to a solution of 107 grams of a copolymer of 43% by weight of ethylene and 57% by weight of vinyl acetate in 120 cc. of methylacrylate. The mixture is maintained at about 75° C. for 10 hours, and is then poured into an excess of methanol. The product is isolated in the usual manner.

*Example VII*

This example describes the production of a functional polymer having the structure of an ethylene-vinyl acetate-vinyl methacrylate copolymer, by the action of methacrylic acid and acetic anhydride on a copolymer of ethylene, vinyl alcohol and vinyl acetate.

A mixture prepared by adding 1 litre of methacrylic acid containing 25 grams of toluene-p-sulphonic acid to a solution of 880 grams of a copolymer of 70% by weight of ethylene, 27% by weight of vinyl alcohol and 3% by weight of vinyl acetate in 2.5 litres of toluene is maintained at about 85° C. for 40 hours. 2 litres of toluene and 800 cc. of acetic anhydride are then added, and the mixture is held at 60° C. for a further 6 hours. The product is isolated following precipitation with methanol and is air dried. About 1,080 grams of a product having the composition of a copolymer of about 55% by weight of ethylene, about 34% by weight of vinyl acetate and about 11% by weight of vinyl methacrylate are obtained.

*Example VIII*

This example describes the production of a functional polymer having the structure of an ethylene-vinyl acetate-vinyl methacrylate copolymer by the action of methyl methacrylate on an ethylene-vinyl acetate copolymer in the presence, as catalyst, of sodium methoxide.

2 cc. of a 10% by weight solution of sodium methoxide in methanol are added to a solution of 30 grams of a copolymer of 55% by weight of ethylene and 45% by weight of vinyl acetate in 60 cc. of methyl methacrylate. The mixture is maintained at about 50° C. for 15 minutes. 2 cc. of methacrylic acid are then added to neutralize the sodium methoxide and the mixture is poured into an excess of methanol. The product, which weighs about 25 grams, is found to contain methacrylate groups equivalent to about 6% by weight of vinyl methacrylate.

*Example IX*

This example describes the preparation of a functional polymer having the structure of an ethylene-vinyl acetate-vinyl acrylate copolymer by the reaction of acrylic acid and acetic anhydride on the ethylene-vinyl alcohol-vinyl acetate copolymer employed in Example VII.

A mixture of 25 cc. of acrylic acid and 25 cc. of acetic anhydride containing 1 gram of toluene-p-sulphonic acid is added to a mixture of 25 grams of the ethylene-vinyl alcohol-vinyl acetate copolymer and 50 cc. of toluene at 75° C. A homogenous solution is quickly obtained, and after a further three hours at about 75° C. the polymer is isolated in the manner described in Example VII. It contains about 2% by weight of combined vinyl acrylate.

*Example X*

This example describes the production of a functional polymer having a structure of an ethylene-vinyl acetate-vinyl methacrylate copolymer by reaction of methyl methacrylate on an ethylene-vinyl acetate copolymer in the presence, as catalyst, of lithium methoxide.

3.8 grams of lithium methoxide are dissolved in 30 cc. of methanol and the solution is added to 400 cc. of methyl methacrylate. The resulting solution is added to a solution of 400 grams of a copolymer of 55% by weight of ethylene and 45% by weight of vinyl acetate dissolved in 1.5 litres of toluene at 60° C. The mixture is maintained at about 60° C. for five hours, and the catalyst is then neutralized and the product isolated as described in Example 8. The product is found to contain 4.5% by weight of combined vinyl methacrylate.

*Example XI*

This example describes the production of a functional polymer having the structure of an ethylene-vinyl acetate-vinyl methacrylate copolymer by the reaction of methyl methacrylate on an ethylene-vinyl acetate copolymer in the presence, as catalyst, of titanium butoxide.

A mixture of 10 cc. of methyl methacrylate and 2 cc. of titanium butoxide is added at 50° C. to a solution in 15 cc. of toluene of 5 grams of the ethylene-vinyl acetate copolymer employed in Example X. The solution is kept at about 50° C. for four hours, after which 2 cc. of methacrylic acid are added. The product is isolated as described in Example VIII and is found to contain about 5.0% by weight of combined vinyl methacrylate.

*Example XII*

This example describes the production of a functional polymer having the structure of a styrene-allyl alcohol-vinyl acrylate copolymer by partial esterification with acrylic acid of a styrene-allyl alcohol copolymer containing about 30% by weight of allyl alcohol.

50 cc. of acrylic acid containing 1 gram of toluene-p-sulphonic acid and 1 gram of hydroquinone are added to a solution of 10 grams of the styrene-allyl alcohol copolymer dissolved in 100 cc. of a 50/50 volume mixture of xylol and methyl ethyl ketone. The mixture is heated to reflux and maintained thereat for 2 hours. The product is recovered as in Example I and is found to contain combined allyl acrylate.

The novel functional polymers of this invention are readily converted into thermoset structures by cross-polymerization of the substiuent ethylenically unsaturated acyloxy

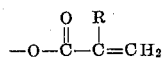

groups or copolymerization thereof with other monomers, or using for example, a conventional peroxide catalyst. More particularly, these functional polymers find use, for example, in preparing molded laminates or as the polyester component in glass fiber-polyester structures. They may also be used, in liquid or solution form, as casting resins. They are excellently suited as adhesives in joining various materials together.

The novel functional resins of this invention may be modified by the incorporation of conventional additives such as dyes, pigments, fillers, extenders, etc. They may be used alone or in conjunction with other polymeric materials.

It is obvious that many variations may be made in the products and processes set forth above without departing from the spirit and scope of this invention.

What is claimed is:

1. An interpolymer consisting of a plurality of recurring structural groups corresponding to the following structural formulae

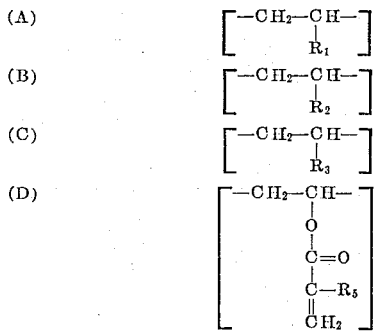

wherein Formula A comprises 25 to 95 molar percent, Formula B comprises zero to 70 molar percent; Formula C comprises zero to 70 molar percent and Formula D comprises 1.0 to 20 molar percent, the total of Formulae A, B, C and D being 100 molar percent; and wherein $R_1$ is selected from the group consisting of hydrogen, phenyl and alkyls of from 1 to 2 carbon atoms; $R_2$ is selected from the group consisting of hydroxyl and hydroxy methylene; $R_3$ is selected from the group consisting of $$-O-\overset{\overset{O}{\|}}{C}-R_4$$

and $$HO-\overset{\overset{O}{\|}}{C}-R_4-\overset{\overset{O}{\|}}{C}-O-$$

wherein $R_4$ is a hydrocarbon residue of from 1 to 12 carbon atoms and $R_5$ is selected from the group consisting of hydrogen and alkyls of from 1 to 4 carbon atoms.

2. A copolymer as in claim 1 having a composition which is substantially 70% by weight ethylene, 15% by weight vinyl alcohol, and 15% by weight vinyl acrylate.

3. A copolymer as in claim 1 having a composition which is substantially 70% by weight ethylene, 14% by weight vinyl alcohol and 16% by weight vinyl methacrylate.

4. A copolymer as in claim 1 having a composition which is substantially 43% by weight ethylene, 40% by weight vinyl acetate and 13% by weight vinyl methacrylate.

5. A copolymer as in claim 1 having a composition of 43% by weight ethylene, 10% by weight vinyl alcohol, 36% by weight vinyl acetate and 11% by weight vinyl methacrylate.

6. A process for the preparation of an interpolymer consisting of a plurality of recurring structural groups corresponding to the following structural formulae (A) $\left[-CH_2-\underset{R_1}{CH}-\right]$ (B) $\left[-CH_2-\underset{R_2}{CH}-\right]$ (C) $\left[-CH_2-\underset{R_3}{CH}-\right]$ (D) $\left[\begin{array}{c}-CH_2-CH-\\ |\\ O\\ |\\ C=O\\ |\\ C-R_5\\ \|\\ CH_2\end{array}\right]$ wherein Formula A comprises 25 to 95 molar percent, Formula B comprises zero to 70 molar percent, Formula C comprises zero to 70 molar percent and Formula D comprises 1.0 to 20 molar percent, the total of Formulae A, B, C and D being 100 molar percent; and wherein $R_1$ is selected from the group consisting of hydrogen, phenyl and alkyls of from 1 to 2 carbon atoms; $R_2$ is selected from the group consisting of hydroxyl and hydroxy methylene; $R_3$ is selected from the group consisting of $$-O-\overset{\overset{O}{\|}}{C}-R_4$$

and $$HO-\overset{\overset{O}{\|}}{C}-R_4-\overset{\overset{O}{\|}}{C}-O-$$

wherein $R_4$ is a hydrocarbon residue of from 1 to 12 carbon atoms and $R_5$ is selected from the group consisting of hydrogen and alkyls of from 1 to 4 carbon atoms; said process comprising at least partially reacting a polymer comprising in copolymerized form an olefinic hydrocarbon and an ethylenically unsaturated alcohol with an ethylenically unsaturated acid corresponding to the general formula $$CH_2=\overset{\overset{R_5}{|}}{C}-\overset{\overset{O}{\|}}{C}-OH$$

wherein the carboxylic group of the ethylenically unsaturated acid reacts with the hydroxyl groups of the polymer; wherein $R_5$ is selected from the group consisting of hydrogen and alkyl groups of from 1 to 4 carbon atoms.

7. A process as in claim 6 where the alcohol moiety is introduced into the polymer by at least partially hydrolyzing an olefin/vinyl ester copolymer.

8. A process as in claim 6 where the ethylenically unsaturated alcohol is allyl alcohol.

References Cited by the Examiner

UNITED STATES PATENTS

| | | | |
|---|---|---|---|
| 2,169,250 | 8/1939 | Izard | 260—91.3 |
| 2,399,653 | 5/1946 | Roland | 260—87.3 |
| 2,441,515 | 5/1948 | Snyder | 260—80.5 |
| 2,725,372 | 11/1955 | Minsk | 260—91.3 |
| 3,004,851 | 10/1961 | Brown | 260—885 |
| 3,153,022 | 10/1964 | Calkins et al. | 260—80.5 |

JOSEPH L. SCHOFER, *Primary Examiner.*

W. HOOVER, *Assistant Examiner.*